May 22, 1956  C. THOMSON  2,746,596
CONVEYORS
Filed Feb. 17, 1953  5 Sheets-Sheet 1
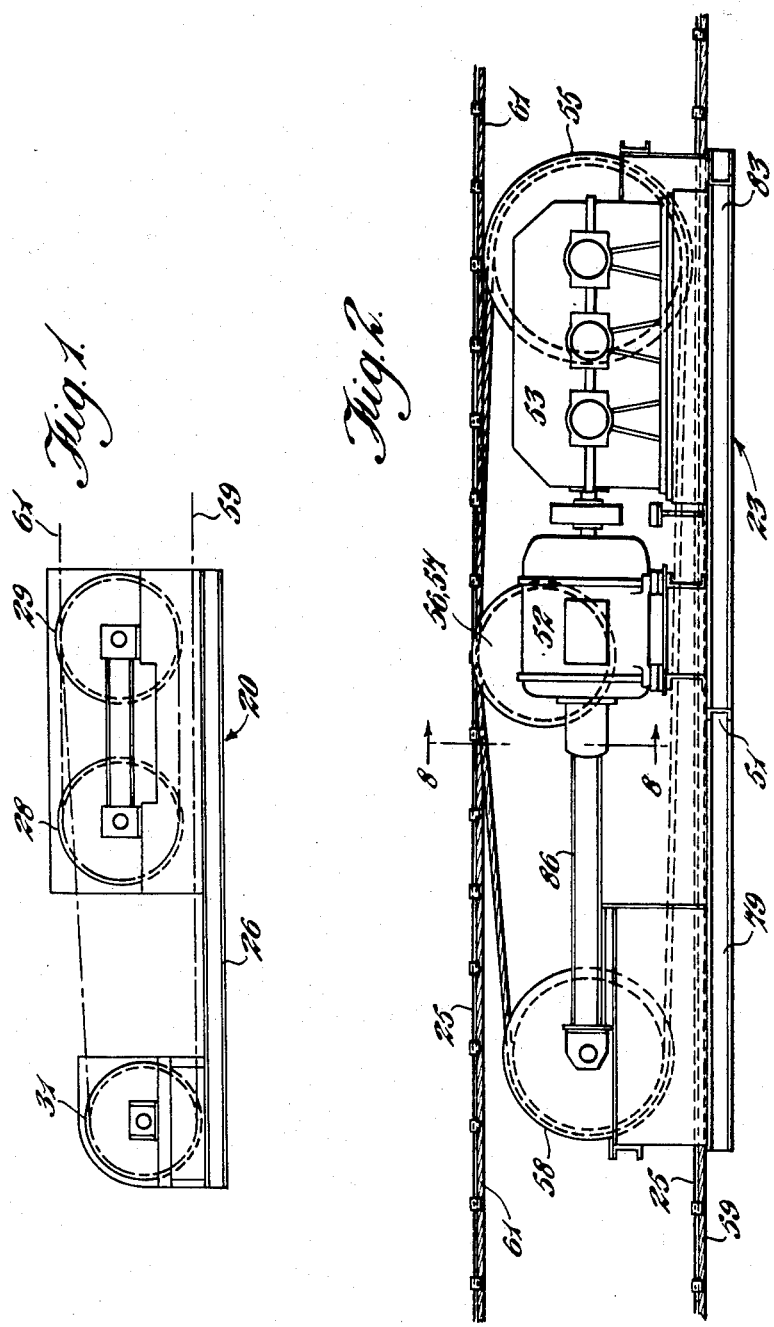

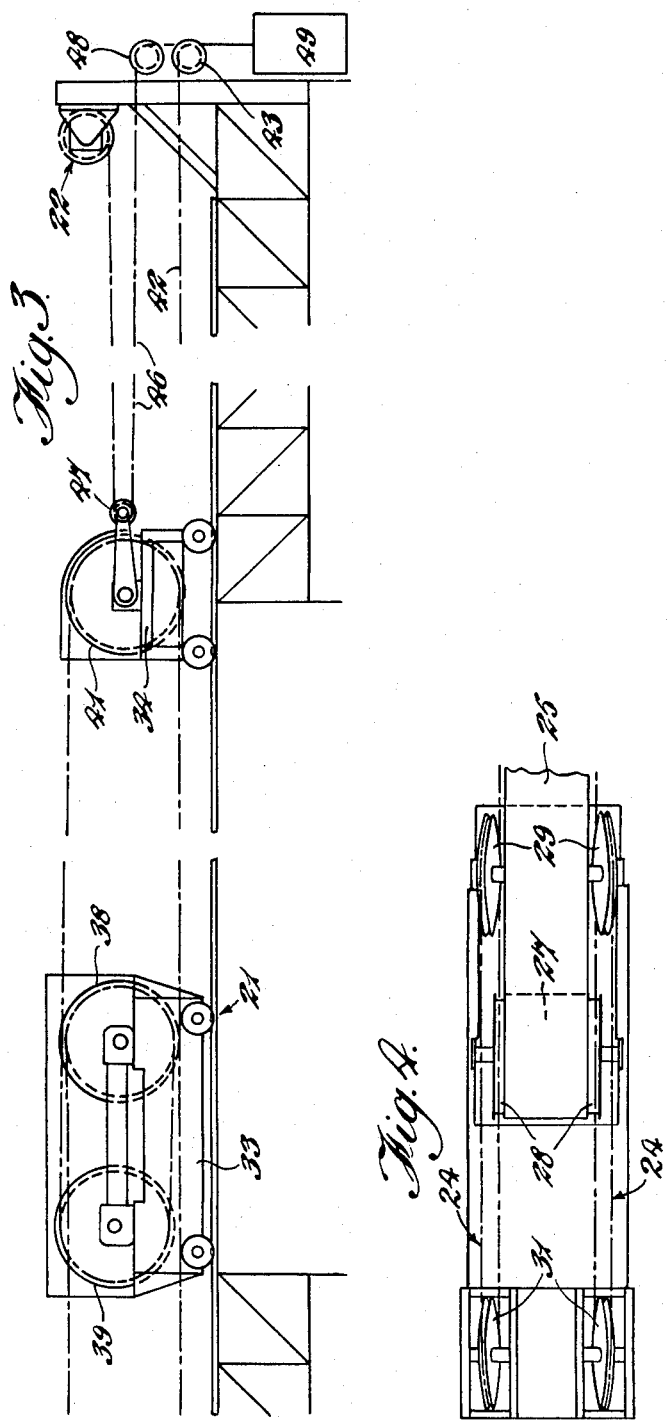

May 22, 1956 C. THOMSON 2,746,596
CONVEYORS
Filed Feb. 17, 1953 5 Sheets-Sheet 3
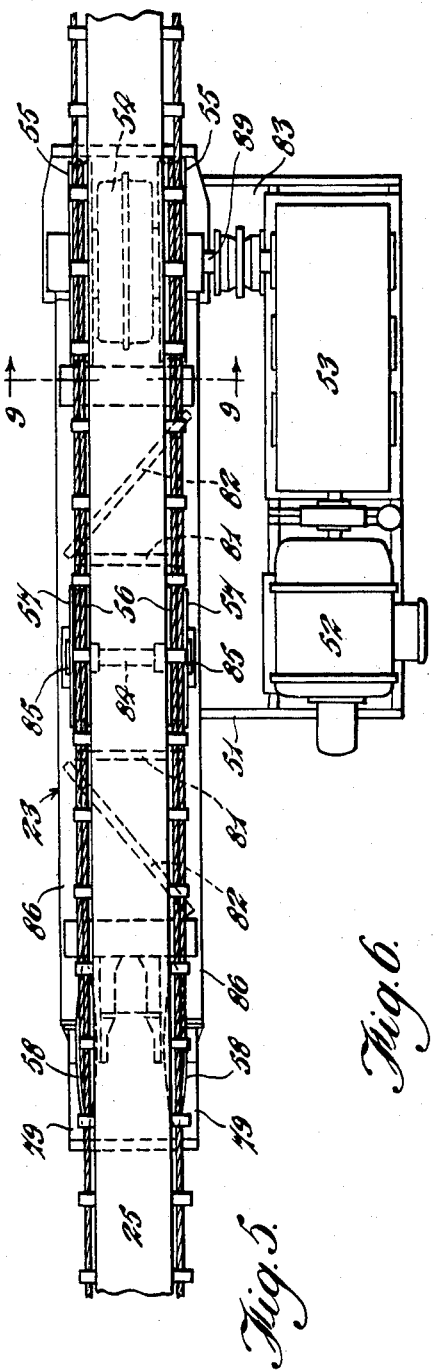

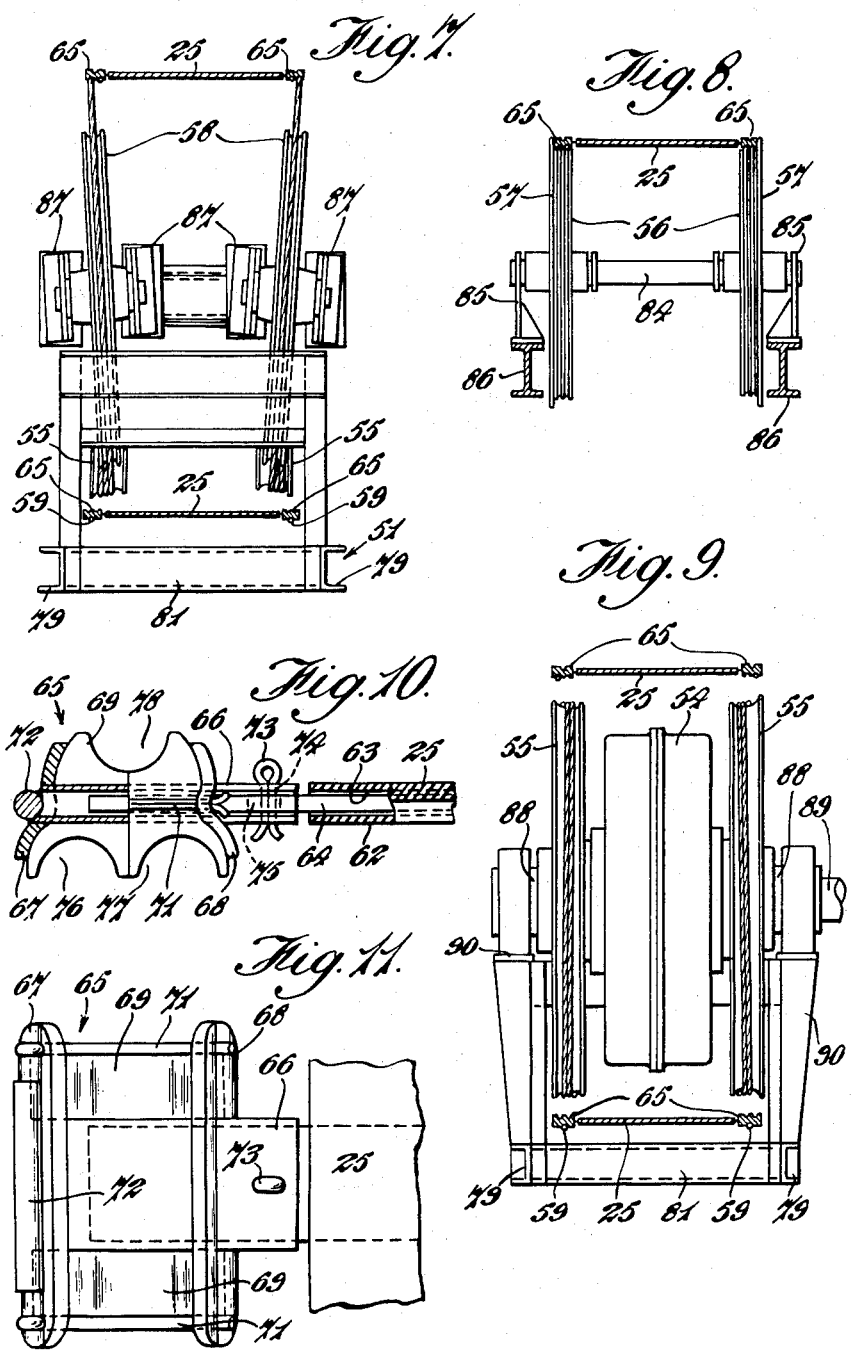

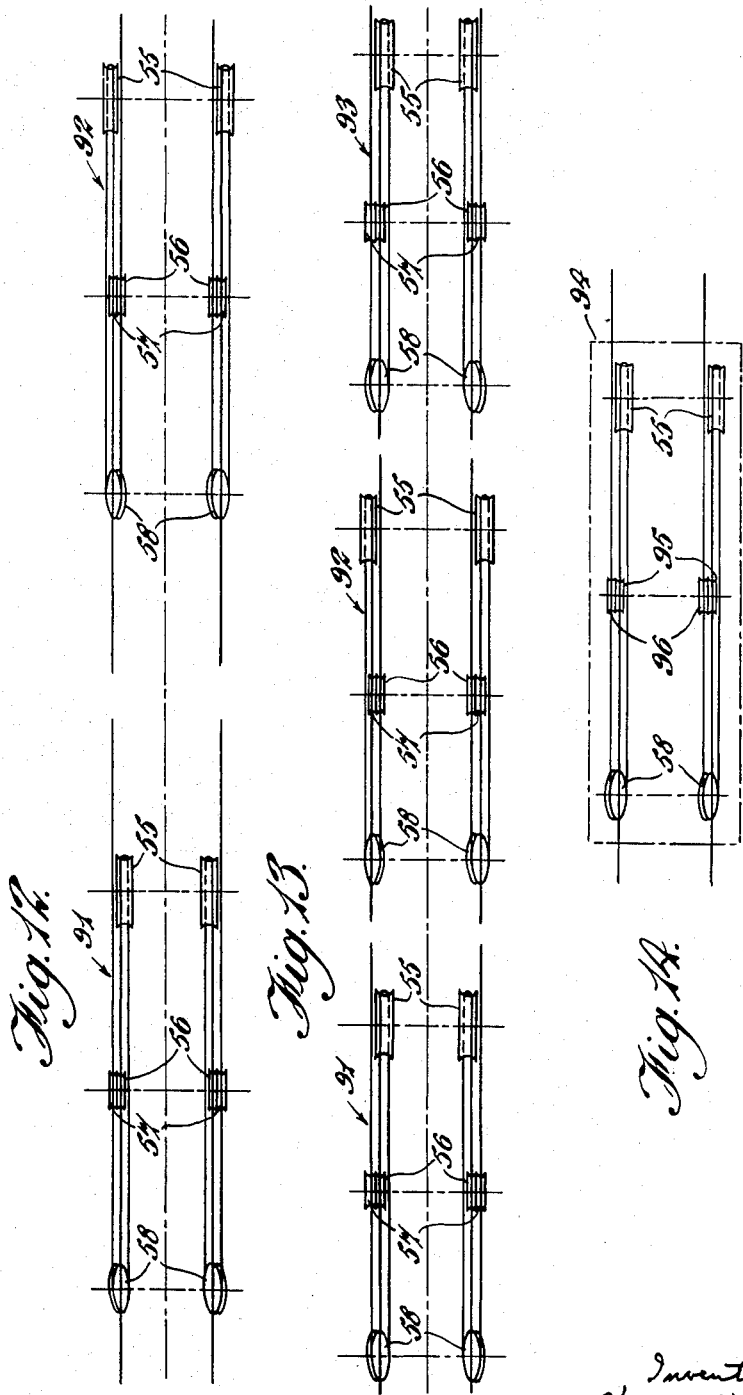

United States Patent Office 2,746,596
Patented May 22, 1956

2,746,596

CONVEYORS

Charles Thomson, Montreal West, Quebec, Canada, assignor to Cable Belt Limited, Inverness, Scotland, a British company Application February 17, 1953, Serial No. 337,415

Claims priority, application Great Britain March 3, 1952

10 Claims. (Cl. 198—203)

This invention relates to conveyors of the kind in which an endless belt, or an endless loop comprising a plurality of spaced belt sections connected by cables, is driven by one or more cable circuits extending along the whole length of the conveyor, the belt engaging the cables forming the cable circuits by means of shoes or other members which engage downwardly with the cables, and are readily separable therefrom.

As will presently appear, a preferred embodiment of the invention is especially adapted for use in conveyors in which the belt is supported by the driving cables through the intermediary of shoes mounted on resilient metal straps extending across and attached to the belt.

It has previously been the practice, in conveyors of this kind, to apply the power for driving the conveyor at the one end, usually the discharge end, thereof, but this arrangement has a number of disadvantages, amongst which is the fact that in mines, where such conveyors are commonly used, the space at the ends is often limited, and difficulty is experienced in finding room for the driving gear. The present invention avoids this disadvantage by eliminating the necessity for locating the power unit at either end of the conveyor, and consequently provides the further advantage that the power unit or units can be placed at any point on the length of the conveyor where a convenient solid foundation is available, enabling the end units, if they are required to be in elevated positions, to be supported on relatively light structures.

The main object of the present invention is to provide an arrangement whereby the driving power can be applied to the cable circuits at one or more points intermediate the ends of the conveyor, in addition to, or instead of, at the end or ends thereof.

Another object is to provide a conveyor including a power unit or units which can be inserted at any point in the length of the conveyor.

A further object of the invention is to provide a conveyor in which a pair of cable circuits driving an endless belt are guided to form loops intermediate the ends of the conveyor, and driving power is applied to the said loops in the cable circuits.

The invention essentially consists in providing, in a conveyor including a pair of endless cables, means guiding each of said cables in a circuit between spaced points, and belt means driven from said cables, means intermediate said points for applying power to said cables.

The invention also consists in providing, in a conveyor as set forth in the last preceding paragraph, means intermediate the spaced points for guiding each of the cables in a local circuit away from and back to one of the runs of the conveyor with a small gap between the departure point from and the return point of the run, and means in said local circuit for applying power to said cables.

The accompanying drawings illustrate a preferred embodiment of the invention described herein by way of example.

In the drawings:

Figure 1 is a diagrammatic side elevation of the loading end of the conveyor;

Figure 2 is a side elevation of the driving unit of the conveyor;

Figure 3 is a diagrammatic side elevation of the delivery end of the conveyor;

Figure 4 is a diagrammatic plan view of the loading end of the conveyor shown in Figure 1;

Figure 5 is a plan view of the driving unit of the conveyor;

Figure 6 is a diagrammatic plan view of the parts of the conveyor shown in Figure 2;

Figures 7, 8 and 9 are views of the driving unit on an enlarged scale, Figure 7 being an end view looking from the left-hand end of Figure 2, Figure 8 is a transverse section on the line 8—8 of Figure 2, and Figure 9 a transverse section on the line 9—9 of Figure 5.

Figure 10 is a partial cross-section of the belt on a still larger scale showing a cross-strap and cable-engaging shoe;

Figure 11 is a plan view of the parts shown in Figure 9;

Figure 12 is a diagrammatic plan view showing two driving units included in a single conveyor;

Figure 13 is a diagrammatic plan showing three driving units included in a single conveyor; and Figure 14 is a diagrammatic plan showing a driving unit so arranged that the spacing between the cables after they have passed the driving unit is the same as their spacing before they reach the driving unit.

Referring first to Figures 1, 2 and 3 of the drawings, the conveyor comprises a loading end unit 20 a delivery end unit 21, a cable tensioning assembly 22 and a driving unit 23. Two parallel cable circuits 24, 24 each consisting of an endless cable, extend from the loading end unit 20 to the delivery end unit 21, and an endless belt 25 is located between the two cable circuits 24, being supported on and driven by the cables of said circuits, see Figure 4. It will be understood that the driving unit 23, or a plurality of such driving units, can be located at any suitable position or positions between the two end units.

The loading or tail end unit 20 consists of a base 26 supporting bearings for three pairs of cable pulleys and a belt drum 27, the belt drum 27 being mounted co-axially with the pulleys 28, 28 of one pair, which pulleys 28, 28 lie in parallel planes perpendicular to the axis of the drum 27. On the side of the pulleys 28, 28 nearer to the opposite end of the conveyor are mounted pulleys 29, 29 forming a second pair, the pulleys 29, 29 being mounted with their axes inclined upwardly towards the centre line of the conveyor, so that the said pulleys are inclined upwardly and outwardly. The lowest point on the rim of each pulley 29 lies in the plane of the pulley 28 on the same side of the conveyor, so that the highest point on its rim is offset outwardly from the said plane. The pulleys 31, 31 forming the third pair are mounted on the opposite side of the pulleys 28, 28, and are also inclined upwardly and outwardly, the highest points on their rims being in longitudinal alignment with the highest points on the rims of the corresponding pulleys 29, 29, and the pulleys 31, 31 are inclined to the vertical at a slightly smaller angle than the pulleys 29, 29, so that the lowest points on their rims are spaced apart slightly more widely than the lowest points on the rims of the pulleys 29, 29. The pulleys 31, 31 are mounted lower than the pulleys 28, 28 and 29, 29, as shown in Figure 1, all of the pulleys being mounted in fixed relation one to the other.

The delivery or head end unit 21 comprises a truck 33 and two trucks 34, 34, the truck 33 running on two rails 35 extending parallel to the length of the conveyor, and each of the trucks 34 running on one rail 35 and on an inner rail 36. The truck 33 carries, on a horizontal transverse shaft, a belt drum 37 and two cable pulleys 38, 38 one at each end of the drum. Also mounted on the truck 33, on the side of the pulleys 38, 38 nearer to the loading end of the conveyor, are pulleys 39, 39 forming a second pair, the pulleys 39, 39 being inclined upwardly and outwardly and each having the lowest point of its rim in the plane of the corresponding pulley 38. Each truck 34 carries one pulley 41 of a third pair, the pulleys 41 being inclined similarly to the pulleys 39 but at a greater angle to the vertical. The uppermost point on the rim of each pulley 41 is in the same longitudinal vertical plane as the uppermost point on the rim of the pulley 39 on the same side of the conveyor, so that the lowermost point on the rim of each pulley 41 is offset inwardly with respect to the lowermost point on the rim of the said pulley 39.

A cable 42 secured to the truck 33 extends over a pulley 43 mounted on the cable tensioning assembly 22 and carries a suspended weight 45, whilst two cables 46, 46 each secured at one end to the assembly 22 pass respectively round pulleys 47, 47 mounted on the trucks 34, 34, and over pulleys 48, 48 mounted on the assembly 22, each of the cables 46 carrying a suspended weight 49 at its free end. The weights 49 maintain tension on the cable circuits, and the weight 45 maintains tension on the belt, the truck 33 being free to move along the rails independently of the trucks 34 since the cables form loops about the pulleys 38 and 39.

The driving unit 23 is located between the end units 20 and 21, and comprises a fixed base 51 supporting auxiliary pulley means consisting of three groups of pulleys, an electric motor 52, a reduction gear 53, and a differential gear 54. Two pulleys 55, 55 constituting one group are driven by the electric motor 52 through the reduction gear 53 and the differential gear 54, the said differential gear being located between the two pulleys, the pulleys 55, 55 being in parallel planes, and being at the end of the base 51 nearer to the delivery end of the conveyor. Adjacent the longitudinal centre of the base are mounted four co-axial pulleys forming the second group, this group including two inner pulleys 56, 56 and two outer pulleys 57, 57. The third group of pulleys, which is mounted towards the opposite end of the base 51 comprises two inclined pulleys 58, 58 having the lowest points of their rims in the planes in which the cables leave the driving pulleys 55, and the uppermost points of their rims in the planes of the pulleys 57. The pulleys 56 and 57 are smaller than the pulleys 55 and 58, and are so mounted that the uppermost points on their rims are located above the uppermost points of the pulleys 55 and 58.

The two cable circuits 24, 24 are identical, and the path of the cable in only one of them will therefore be described. At the loading or tail end of the conveyor (Figure 1), the cable comes in on the return run 59, passes upwardly around the pulley 31, downwardly around the pulley 29 and upwardly around the pulley 28, from the top of which it leaves the loading end unit on the upper or carrying run 61. The advancing upper run portion of the cable next passes (as shown in Figure 5) over the inner pulley 56 on the driving unit 23, is wrapped, say, two-and-a-half times round the driving pulley 55, and leaves the bottom of that pulley, running next to the bottom of the inclined pulley 58, from the top of which it passes over the outer pulley 57 and is returned, closely adjacent the advancing upper run portion, to the upper or carrying run 61. From the pulley 57 the cable provides a laterally offset continuation portion of the upper run, extending to the top of the pulley 38 on the delivery end unit (Figure 3), round which pulley 38 it runs to the bottom of the pulley 39, from the top of the pulley 39 to the top of the pulley 41, and round the pulley 41 upon leaving which it starts on the return run. The spacing between the two cables on the part of the carrying run between the pulleys 28 and the pulleys 57 is smaller than the spacing between the said cables on the part of the carrying run between the pulleys 57 and the pulleys 38, there being a small lateral gap between the two parts of each cable at the pulleys 56, 57. On the return run, the spacing of the cables is greater than that on the first part of the carrying run and less than that on the second part of the return run so that, viewed in a vertical direction, the cable on the return run lies midway between the two parts of the cable on the carrying run. The cables are supported at intervals between the units 20 and 23, and between the units 23 and 21, by stand pulleys in the known manner.

Each endless cable therefore includes main circuit upper (or carrying) and lower (or return) runs extending between head and tail pulleys, and a local circuit intermediate the head and tail pulleys, in which the cable is guided, by auxiliary pulleys, first downwardly, then rearwardly, and then upwardly and forwardly to provide a laterally offset continuation portion of the main circuit upper run which is closely adjacent to the advancing main circuit upper run portion where the latter enters the local circuit.

In the conveyor to which the invention is herein shown as applied for purposes of illustration, the belt 25 comprises rubber or equivalent material moulded on to a reinforcement of material such as cotton duck, and is provided at intervals with cross straps 64 consisting of rectangular-section bars of spring steel passing through slots 63 and projecting on both sides of the belt, a shoe 65 being mounted for limited sliding movement on each end of each cross-strap 64. Each shoe 65 comprises a steel tube 66 of rectangular cross-section fitting over the cross-strap, two metal side plates 67 and 68 welded to the tube 66, and a pair of rubber blocks 69 located between the side plates, one on each side of the tube 66, and held against endwise movement by split pins 71. A round bar 72 welded to the outer end of the tube 66 and to the side plate 67 provides added strength, and the shoe is retained on the cross-strap by a split pin 73 passing through holes 74 in the tube and a slot 75 in the cross-strap.

Each of the rubber blocks is formed on one side with two grooves 76 and 77, parallel one to the other and to the edge of the belt, the spacing between the centres of these grooves being equal to the spacing of the centres of the two parts of a cable on the carrying run, and on the other side of each block is formed a single groove 78, midway between the grooves 76 and 77.

The belt comprises a plurality of lengths formed into a continuous loop, and passes over the two belt drums 27 and 37, being supported between the said drums by the downward engagement of the grooves in the rubber blocks with the cables.

On the first part of the carrying run, between the loading end unit 20 and the driving unit 23, the grooves 77 in the shoe blocks engage the cables, but when each cross-strap reaches the pulleys 56, 57, the cables are led away from the grooves 77, and the grooves 76 pick up on the parts of the cables running over the pulleys 57, with which parts the said grooves remain in engagement until the said cross-strap reaches the delivery end unit 21. Here the belt travels round the drum 37 whilst the cables travel round the co-axial pulleys 38, and the cables are then led away from the grooves 76 by the pulleys 39. The return runs of the cables, coming from the pulleys 41, are parallel to and slightly offset laterally from the parts of the cables between the pulleys 38 and 39, so as to be underneath, and aligned with, the grooves 78 in the shoe blocks, and the shoes are thus picked up by the return runs of the cables as the grooves 76 are disengaged. At the loading end unit, the incoming cables on the return run are similarly offset from the parts of the cables between the pulleys 29 and 28, so that the grooves 77 in the shoe blocks are led into engagement with the cables for the first part of the carrying run.

The cross-straps are normally straight, but sag under the load of material fed to the conveyor, thus producing troughing of the belt only when the latter is loaded. The cross-straps act as beams to support the load, so that the said load produces no inward pull on the cables, and, in this preferred form of conveyor, the freedom of the shoes to slide on the cross-straps prevents the said shoes from being pulled inwardly due to the curvature of the cross-straps under load.

As shown in Figures 2, 5, and 7 to 9 inclusive, the base 51 of the driving unit 23 comprises a pair of longitudinal channel members 79, 79 connected by cross members 81, and diagonal bracing members 82, and a lateral extension platform 83 on which the electric motor 52 and the reduction gear 53 are mounted. The pulleys 56 and 57 are all mounted freely on a common shaft 84 carried in bearings in brackets 85 mounted on H-section girders 86 suitably supported above the base 51, and the inclined pulleys 58 are carried each on a shaft mounted between two bearing brackets 87. The driving pulleys 55 are mounted on hollow shafts 88, 88 free to turn on a driving shaft 89 mounted in pedestal bearings 90, 90, the driving shaft being coupled to the output shaft of the reduction gear 53, and driving the pulleys 55 through the differential gear 54.

The preceding description relates to a conveyor in which only one driving unit 23 is used, that driving unit providing the whole of the power for driving the conveyor. Additional power may be provided by a driving unit, which may be of conventional type at one or both ends of the conveyor; or by one or more additional driving units similar to the unit 23 arranged at spaced points in the length of the conveyor. The application of the drive at two or more points, which is thus made possible, enables smaller cables to be used, since the maximum tension in the cables is reduced, and enables power for conveyors of different lengths to be supplied by standard driving units which are provided in a number appropriate to the length of the conveyor. The use of smaller ropes results in the ability to use smaller pulleys and smaller shoes, and generally reduces the size of the parts, thus making for economy and convenience of handling. Figure 12 shows, diagrammatically, an arrangement including two intermediate driving units, and Figure 13 an arrangement including three intermediate driving units.

In Figure 12, the driving units are indicated at 91 and 92 and each includes driving pulleys 55, 55 and pulleys 56, 57 as previously described. In the driving unit 91 nearer to the loading end of the conveyor, the planes of the inclined pulleys 58, 58 are inclined upwardly and outwardly, but in the driving unit 92, the planes of the inclined pulleys 58, 58 are inclined upwardly and inwardly. The cables coming in to the unit 91 pass over the inner pulleys 56, 56 and are deflected outwardly by the inclined pulleys 58, 58 to bring them into line with the outer pulleys 57, 57, but in the unit 92 the incoming cables engage the pulleys 57, 57, and are deflected inwardly to pass over the pulleys 56, 56 as they leave that driving unit. The inclination of the pulleys 41 at the delivery end is modified to deflect the outgoing cables outwardly instead of inwardly relative to the incoming cables. In the arrangement of Figure 13, a third driving unit 93 is provided between the driving unit 92 and the delivery end unit, this driving unit 93 being identical with the driving unit 91, and acting to return the cables on the carrying run to the wider spacing, so that the delivery end unit is identical with that used when only one driving unit is employed.

The driving units so far described herein are such that the spacing of the cables on the upper or carrying run of the conveyor as they approach the said unit is different from their spacing as they leave the unit, and pulley stands of two different widths are therefore required to support the cables between the driving unit and the head and tail units respectively. Figure 14 shows, diagrammatically, a modified arrangement of the driving unit which provides uniform spacing of the upper or carrying runs of the cables throughout the whole length of the conveyor.

The driving unit is indicated generally by the reference 94, and the driving pulleys and inclined pulleys are indicated respectively by the references 55 and 58 as previously. In this arrangement the inclined pulleys 58 are in planes parallel to each other, so that one cable is displaced outwardly and the other inwardly. The advancing upper run portions of the cables pass over guide pulleys 95, 95 corresponding to the guide pulleys 56 previously described, whilst the continuation portions of the upper runs, in leaving the local circuits, pass over guide pulleys 96, 96 one of which is located on the inner side of the corresponding pulley 95, whilst the other is located on the outer side of the corresponding pulley 95. Between the tail unit 20 and the driving unit 94 one shoe on each cross strap engages a cable with its outer groove and the other shoe engages the other cable with its inner groove, whilst between the driving unit 94 and the head unit 21 the head on each cross strap which had previously engaged the cable with its outer groove now engages with its inner groove, and the head which had previously engaged the cable with its inner groove now engages with its outer groove.

Any known means may be employed for synchronizing the speeds of the driving pulleys 55 in the several driving units.

I claim:

1. In a conveyor including head and tail units, a pair of endless cables, means guiding each of said cables in a circuit including upper and lower runs between said head and tail units, endless belt means driven by said cables, cable engaging means adjacent the edges of said belt, means intermediate the head and tail units for guiding the cables in a local circuit away from and back to one of said runs with a small gap between the departure point from and the return point to the run, said cable engaging means including gap bridging means for supporting the belt means during its passage over the gap, and means in said local circuit for applying power to said cables.

2. In a conveyor including head and tail units, a pair of endless cables, means guiding each of said cables in a circuit including upper and lower runs between said head and tail units, endless belt means driven by said cables, cable engaging means adjacent the edges of said belt, means intermediate the head and tail units to guide the cables in a local circuit away from and back to said upper run with a small gap between the departure point from and the return point to said run, said cable engaging means including gap bridging means supporting the belt means during its passage over the gap, and means in said local circuit for applying power to said cables.

3. In a conveyor including head and tail units, a pair of endless cables, means guiding each of said cables in a circuit including upper and lower runs between said head and tail units, endless belt means driven by said cables, means intermediate the head and tail units to guide the cables in a local circuit away from and back to said upper run, means in said local circuit to displace the cable laterally so that it leaves the said circuit in a path offset laterally from its path of entry thereto, means in said local circuit to apply power to said cables, and cable engaging means connected to said belt, each of said cable engaging means having two cable engaging portions to engage the cables on the two sides of the local circuits respectively.

4. In a conveyor including head and tail units, a pair of endless cables, means guiding each of said cables in a circuit including upper and lower runs between said head and tail units, endless belt means driven by said cables, means intermediate the head and tail units to guide the cables in a local circuit away from and back to said upper run, an inclined pulley in said local circuit to displace the cable laterally so that it leaves the said circuit in a path offset laterally from its path of entry thereto, means in said local circuit to apply power to said cables, and cable engaging means connected to said belt, each of said cable engaging means having two cable engaging portions to engage the cables on the two sides of the local circuits respectively.

5. In a conveyor including head and tail units, a pair of endless cables, means guiding each of said cables in a circuit including upper and lower runs between said head and tail units, endless belt means driven by said cables, means intermediate the head and tail units to guide the cables in a local circuit away from and back to said upper run, said local circuit guiding means comprising, in each cable circuit, guide pulley means at the departure point from and the return point to said upper run, and a driving pulley and an inclined pulley around which the cables pass between the said guide pulley means, said guide pulley means being spaced laterally with respect to the conveyor, and cable engaging means connected to said belt, each of said cable engaging means having two cable engaging portions to engage the cables on the two sides of the local circuits respectively.

6. In a conveyor including head and tail units, a pair of endless cables, means guiding each of said cables in a circuit including upper and lower runs between said head and tail units, endless belt means driven by said cables, means intermediate the head and tail units to guide the cables in a local circuit away from and back to said upper run, said local circuit guiding means comprising, in each cable circuit, two co-axial pulleys defining respectively the departure point from and the return point to said upper run, and a driving pulley and an inclined pulley around which the cables pass between said departure point and said return point, and cable engaging means connected to said belt, each of said cable engaging means having two cable engaging portions to engage the cables on the two sides of the local circuits respectively.

7. In a conveyor including head and tail units, a pair of endless cables, means guiding each of said cables in a circuit including upper and lower runs between said head and tail units, endless belt means, cable engaging means connected to said belt and detachably engaging said cables, means intermediate the head and tail units to guide each of the cables in a local circuit away from and back to said upper run, means in each of said local circuits to displace the cable laterally so that it leaves the said local circuit in a path offset laterally from its path of entry thereto, two driving pulleys each of which engage the cable in one of said local circuits, a differential gear mounted between said driving pulleys, and power means driving said pulleys through said differential gear, each of the said cable engaging means including two cable engaging portions laterally offset one with respect to the other to engage the cables on the two sides of the local circuits respectively.

8. A conveyor comprising the combination of a pair of laterally spaced endless cables having main circuit upper and lower runs extending between head and tail pulleys; auxiliary pulley means intermediate the head and tail pulleys adapted to receive advancing upper run portions of the cables, guide the same in local circuits downwardly, then rearwardly and then upwardly and forwarding alongside and closely adjacent the said advancing upper run portions to provide laterally offset continuation portions of the main circuit upper runs; motor means for driving the cables in the course of their passage through the said local circuits; a conveyor belt having shoe means associated therewith; said shoe means having downwardly opening grooves engaging with the said advancing and with the said continuation upper run portions of the cables.

9. A conveyor comprising the combination of a pair of laterally spaced endless cables having main circuit upper and lower runs extending between head and tail units; auxiliary pulley means intermediate the head and tail units adapted to receive advancing upper run portions of the cables, guide the same in local circuits downwardly, then rearwardly and then upwardly and forwardly alongside and closely adjacent the said advancing upper run portions to provide laterally offset continuation portions of the main circuit upper runs; motor means for driving the cables in the course of their passage through the said local circuits; a conveyor belt, transverse supporting straps for said conveyor belt, and shoe means associated with said supporting straps; said shoe means bridging the lateral gap between said advancing and continuation upper run portions of the cables so that each supporting strap is continuously supported as it passes from the advancing to the continuation upper run portions of the cables.

10. In a conveyor including head and tail units, a pair of endless cables, means guiding each of said cables in a full main circuit including upper and lower runs between said head and tail units, endless belt means driven by said cables, and cable-engaging means connected to said belt, a cable driving unit intermediate said head and tail units, said cable driving unit comprising a frame, two driving pulleys, one for each endless cable, mounted in said frame, power means for driving said driving pulleys, first guide pulleys, one for each cable circuit, deflecting advancing upper run portions of said cables downwardly on to said driving pulleys, two inclined pulleys one receiving the cable from each of said driving pulleys, and two second guide pulleys each laterally spaced from and coaxial with one of said first guide pulleys, the cables passing over said second guide pulleys from the inclined pulleys to form laterally offset continuation portions of the main circuit upper runs, the cable-engaging means each including two cable-engaging portions to engage the advancing upper run portions and the continuation portions of the main circuit upper runs of the cables respectively.

References Cited in the file of this patent

UNITED STATES PATENTS

| | | |
|---|---|---|
| 826,312 | Catlin | July 17, 1906 |
| 1,970,842 | Crossen | Aug. 21, 1934 |
| 2,482,882 | Swanson | Sept. 27, 1949 |

FOREIGN PATENTS

| | | |
|---|---|---|
| 293,370 | Great Britain | July 4, 1928 |
| 509,122 | Germany | May 19, 1931 |
| 971,648 | France | Aug. 9, 1950 |